Nov. 14, 1939.   R. T. ZWACK   2,180,287
ROTATION CONTROL MECHANISM
Filed May 16, 1938   2 Sheets-Sheet 1
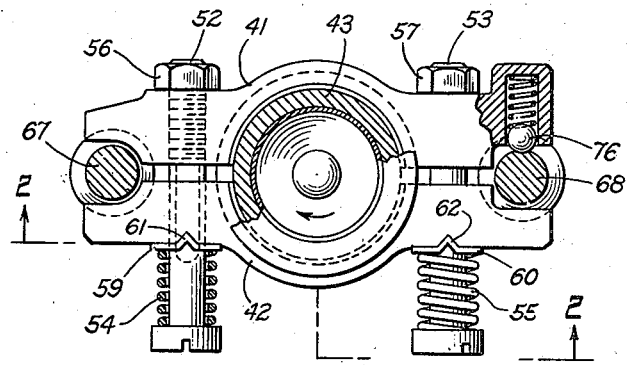
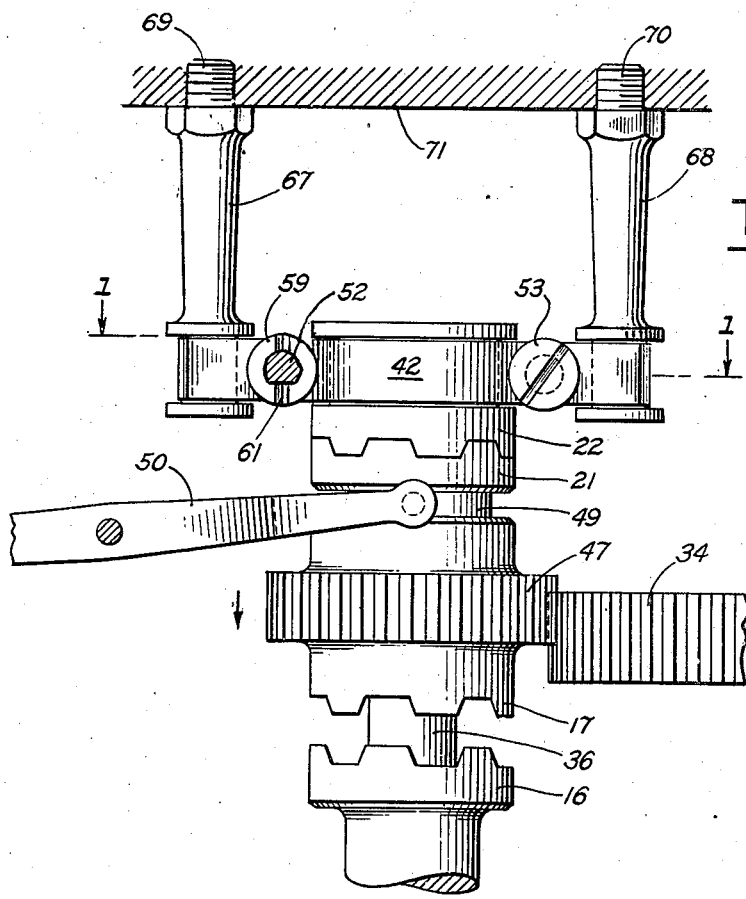
INVENTOR.
Raymond T. Zwack
BY
ATTORNEY.

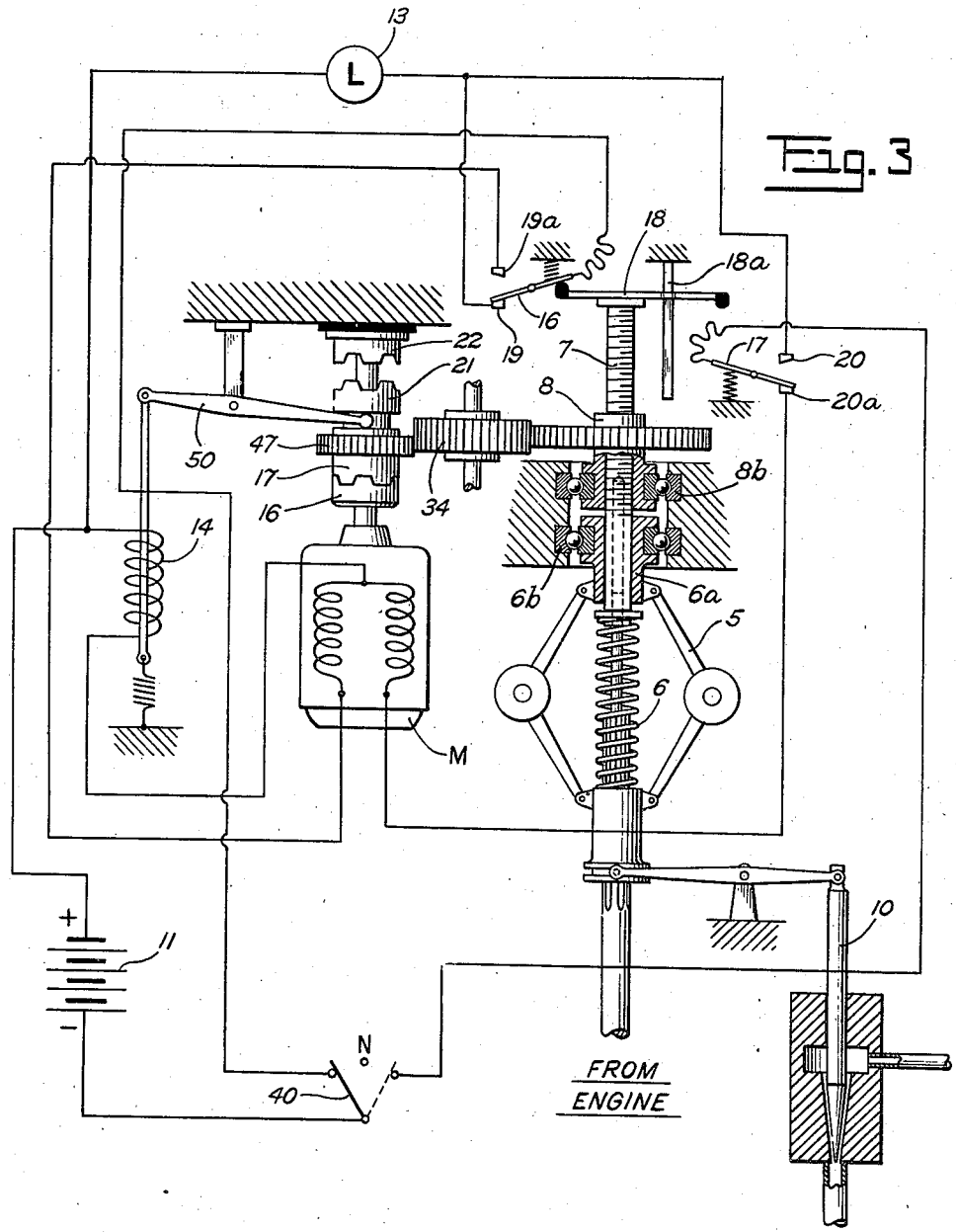

Patented Nov. 14, 1939

2,180,287

UNITED STATES PATENT OFFICE 2,180,287

ROTATION CONTROL MECHANISM

Raymond T. Zwack, East Orange, N. J., assignor to Eclipse Aviation Corporation, East Orange, N. J., a corporation of New Jersey Application May 16, 1938, Serial No. 208,231

6 Claims. (Cl. 192—142)

This invention relates to rotation control mechanism, for control of the transmission of torque from a prime mover to a part to be driven, and particularly to the cessation of torque transmission in such manner as to attain precision in the exact time of cessation of the drive, to the end that objectionable over-travel of the driven parts may be avoided.

In certain control systems where precision in the control of the degree of movement is important, the ordinary means of stopping the transmission elements will not provide satisfactory results; for example, in the automatic control of the governor setting in a propeller pitch changing mechanism, as disclosed in application No. 173,072 filed November 5, 1937, the attainment of best results requires the use of a combined clutch and brake device as illustrated in that application; and the present invention is directed to the provision of an improved clutch and brake of the general character indicated.

An object of the invention is to provide, in a clutch and brake device of the character referred to, novel means for bringing said device from a high speed running condition to a completely stopped condition in the shortest possible period.

Another object is to provide, in such a clutch and brake device, a novel combination of clutch teeth and friction surfaces coacting in such a manner as to achieve the indicated results.

Another object is to provide, in such a clutch and brake device, novel means for controlling the operation of the brake surfaces, and the degree of pressure thereon.

These and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

In the drawings:

Fig. 1 is a transverse view, along the line 1—1 of Fig. 2, of a combined clutch and brake device embodying the invention;

Fig. 2 is a view along the line 2—2 of Fig. 1; and

Fig. 3 is a diagrammatic representation of a system, including the clutch and brake device of Figs. 1 and 2 together with operating means therefor, and driven elements controlled thereby, similar in some respects to that disclosed in application No. 173,052 above described.

In said application No. 173,052, as well as in Caldwell Patent No. 1,893,612, there is disclosed a propeller pitch control mechanism involving a hydraulic unit whose control valve is open or closed to a degree sufficient to correct for any deviation of the engine from a speed pre-selected to be the normal, the shifting of the valve being brought about by the movement of a centrifugal governor and such movement being opposed by a spring whose tension (or compression, as the case may be) is variable, by manual or automatic manipulation of an adjusting screw, for the purpose of changing from one pre-selected speed to another, if and when desired. In the pending application above identified the screw exerts upon the governor spring (thus varying the hydraulic unit valve setting) a pressure proportionate to the degree of rotation of the actuating nut with which the power screw engages—this actuating nut being in turn driven by an electric motor which remains energized only so long as is necessary to establish the pre-selected speed setting of the governor, whereupon said motor is automatically de-energized.

In Fig. 3 of the drawings accompanying and forming part of this specification a corresponding governor is shown at 5, the governor spring at 6, the power screw at 7, the actuating nut at 8, the reversible electric motor at M, and the valve for governing the fluid feed to the Caldwell pitch regulating hydraulic unit at 10. The control circuits include battery 11 (representing any suitable current source), indicator 13, manual directional (field reversing) control switch 40, and a solenoid winding 14 controlling release of the normally engaged clutch elements 16, 17 and simultaneous engagement of the normally disengaged clutch elements 21, 22, the latter of which is frictionally engaged by the novel brake elements shown best in Fig. 1.

The construction shown in Figs. 1 and 2 comprises a pair of semi-circular brake bands 41, 42 constantly urged into frictional, braking relationship with the circumferential surface 43 of clutch element 22 adapted to be engaged by the correspondingly shaped clutch element 21, the latter being shown as integral with spur gear 47 that meshes with gear 34 and slides along said gear when shifting of the clutch is brought about by the means heretofore described. At its opposite end clutch element 21 has teeth 17 adapted to be driven by clutch element 16, as heretofore pointed out, and at an intermediate section 49 it is peripherally grooved to receive yoke 50 constituting part of the electromagnetic shifting means heretofore described.

Brake shoes 41 and 42 have parallel arms with registering apertures to receive through bolts 52, 53, and these bolts receive coiled springs 54, 55 which exert pressure upon the shoes 41, 42, to insure the desired frictional grip on member 22, the degree of pressure being adjustable by turning of the bolts in their respective nuts 56, 57, and thus varying the deflection of the springs. As an added assurance against accidental change in the spring setting, annular locking plates 59, 60, having flat sides (see Fig. 2) engaging flat surfaces of the bolts, are interposed between the springs and the shoe 42, the latter having sharply defined recesses to receive the pointed sections 61, 62 of the locking plates, and thus prevent accidental turning of the springs or bolts from the pre-set positions.

The mounting means for brake shoes 41, 42 includes a pair of anchoring posts 67, 68 with threaded inner ends 69, 70 for fastening to a fixed retaining wall 71, their outer ends being formed with double flanges spaced apart to receive the outer ends of the brake arms, and to yieldably hold said arms against substantial angular shifting. As shown, the yieldably holding means takes the form of a ball detent 76, said detent being spring-pressed into a correspondingly shaped depression in the surface of its associated post 68.

The flyball governor head attaches to and is driven by the engine at proportional speed; the operation of the hydraulically stabilized mechanism to change and control the propeller pitch is controlled by the position of the pilot valve plunger in the governor housing, which in turn, is governed by the compression of the spring. Therefore, to change the pitch of the propeller (to change the speed at which the engine is running) the compression of the spring must be changed by the pilot.

To adjust the spring loading for low pitch position, control switch 40 is operated in the proper direction and held. This closes the electrical circuit of the winding of one field of the reversible D. C. motor M, and the solenoid 14, holding the brake teeth on the movable tooth-clutch element 21 away from associated teeth 22 of the brake. With suitable variable resistance (not shown) inserted in the circuit (as, for example, across the motor armature) the number of seconds required for the spring loader to move all the way from the high to the low pitch position may be regulated as desired. When this pitch limit is reached, contacts 16, 19 (or 17, 20, as the case may be) operate to illuminate indicator 13, thereby signaling the operator to return switch 40 to position "N" (neutral). This swinging of the switch element from its normal position not only energizes indicator 13; it simultaneously breaks the motor circuit at the terminal point 19a (or 20a, as the case may be) thereby allowing the motor and solenoid to deenergize. This instantly causes the movable clutch assembly teeth 21 to engage with the band brake teeth 22, thus bringing the gear train and loader 7 to a sudden stop. It is to be understood that springs or equivalent will be provided, as indicated, to constantly urge the contact arms into engagement with contact terminals 19a and 20a, respectively, and that each of these arms is thereby caused to return to said normal position as soon as the screw-carried switch actuator 18 moves out of engagement therewith. It follows, from the foregoing, that not more than one of said switch arms can be in the open-circuit position, with respect to motor M, at any given time.

To adjust for extreme high pitch position, the operation is the same as above, but in the reverse direction. The spring loading may be stopped at any intermediate position between the limiting ones described above by simply returning the switch 40 to position "N" at the desired intermediate pitch. This allows the clutch-brake to act and stop the loader 7 within approximately .0002 inch from the point occupied when the switch was released. The proper time for release is determined by the engine speed, as indicated on the tachometer. For synchronization, switch 40 may be successively pressed in the proper direction ("inched")—the change in R. P. M. for each "inching" operation being on the order of one or two R. P. M. change. This extreme degree of sensitivity is made possible, as above indicated, by reason of the rapidity of the braking action; yet this rapidity of the braking action has no deleterious effect upon the armature of the driving motor, due to the simultaneous disconnection of the drive at 16, 17, which leaves the motor free to decelerate at a normal pace, with its shaft extension 36 running idly within the journaling means constituted by the clutch-brake elements 21 and 22.

In further explanation of the spring loading screw 7 and associated parts, it may be helpful to point out that the axial travel of the screw produces deflection of spring 6, but produces no corresponding axial movement of governor head 6a, the latter being axially fixed within bearing 6b, and the said bearing constituting part of the means for holding said governor head against axial movement, and at the same time supporting the governor mechanism as a whole. Bearing 6b, along with bearing 8b— the latter being part of the supporting means for nut 8—are mounted in recesses in the supporting housing, as shown. Conversely, rotation of governor head 6a (with the governor weights) produces no effect upon screw 7, as the smooth-bored governor head runs freely on the helical surfaces of the screw, in such manner that each is movable relatively of the other.

Switch actuator 18 may be provided with an aperture adapted to receive a fixed rod 18a to act as a guide and thereby positively restrain the screw against any movement angularly, while permitting unrestricted linear movement in response to rotation of nut 8.

What is claimed is:

1. The combination with a high speed motor and gear train, the latter having a clutch element rotatable therewith, of a friction brake and means for shifting said clutch element into operating relationship to said friction brake, the connection to said brake being by means of a second clutch element engageable by said first-named clutch element and also constituting part of the friction brake, a pair of parallel members, each having arcuate friction surfaces engageable with said second-named clutch element, and means constantly exerting a pre-set degree of pressure upon said parallel members, the pressure upon one being in a direction opposite to that upon the other.

2. The combination with a high speed motor and gear train, the latter having a clutch element rotatable therewith, of a friction brake and means for shifting said clutch element into operating relationship to said friction brake, the connection to said brake being by means of a second clutch element engageable by said first-named clutch element and also constituting part of the friction brake, a pair of parallel members each having arcuate friction surfaces engageable with said second-named clutch element, means constantly exerting a pre-set degree of pressure upon said parallel members, the pressure upon one being in a direction opposite to that upon the other, said last named means including bolts passing through both said parallel members, and pressure exerting means mounted on said bolts.

3. The combination with a high speed motor and gear train, the latter having a clutch element rotatable therewith, of a friction brake and means for shifting said clutch element into operating relationship to said friction brake, the connection to said brake being by means of a second clutch element engageable by said first-named clutch element and also constituting part of the friction brake, a pair of parallel members each having arcuate friction surfaces engageable with said second-named clutch element, means constantly exerting a pre-set degree of pressure upon said parallel members, the pressure upon one being in a direction opposite to that upon the other, said last named means including bolts passing through both said parallel members, pressure exerting means mounted on said bolts, and means engageable with said bolts to prevent turning thereof about their respective axes, after being pre-set.

4. The combination with a high speed motor and gear train, the latter having a clutch element rotatable therewith, of a friction brake and means for shifting said clutch element into operating relationship to said friction brake, the connection to said brake being by means of a second clutch element engageable by said first-named clutch element and also constituting part of the friction brake, a pair of parallel members, each having arcuate friction surfaces engageable with said second-named clutch element, means constantly exerting a pre-set degree of pressure upon said parallel members, the pressure upon one being in a direction opposite to that upon the other, and means for yieldably holding said parallel arms against rocking about the axis of the clutch element, during the braking action.

5. The combination, with a clutch element and friction brake, of means for shifting said clutch element into operating relationship to said friction brake, the connection to said brake being by means of a second clutch element engageable by said first-named clutch element and also constituting part of the friction brake, a pair of parallel members, each having arcuate friction surfaces engageable with said second-named clutch element, and means constantly exerting a pre-set degree of pressure upon said parallel members, the pressure upon one being in a direction opposite to that upon the other.

6. The combination, with a clutch element and friction brake, of means for shifting said clutch element into operating relationship to said friction brake, the connection to said brake being by means of a second clutch element engageable by said first-named clutch element and also constituting part of the friction brake, a pair of parallel members, each having arcuate friction surfaces engageable with said second-named clutch element, and means constantly exerting a pre-set degree of pressure upon said parallel members, the pressure upon one being in a direction opposite to that upon the other, said last-named means including bolts passing through both said parallel members, and pressure exerting means mounted on said bolts.

RAYMOND T. ZWACK.